United States Patent [19]  
Baniel et al.

[11] 4,056,588  
[45] Nov. 1, 1977

[54] BONDED PARTICULATE CERAMIC MATERIALS AND THEIR MANUFACTURE

[75] Inventors: Avraham Matitiahu Baniel, Haifa; Abraham Mitzmager, Kiriat Bialik; Jeanna Segall, Haifa; Shlomo Star, Haifa; Leonard Marshall Shorr, Haifa, all of Israel

[73] Assignee: IMI (TAMI) Institute for Research and Development, Haifa, Israel

[21] Appl. No.: 450,558

[22] Filed: Mar. 13, 1974

Related U.S. Application Data

[63] Continuation-in-part of Ser. No. 230,998, March 1, 1972, abandoned, which is a continuation-in-part of Ser. No. 814,432, April 8, 1969, abandoned, which is a continuation-in-part of Ser. No. 518,792, Jan. 5, 1966, abandoned.

[51] Int. Cl.$^2$ .............................................. C04B 35/64
[52] U.S. Cl. ........................................ 264/63; 264/66
[58] Field of Search ................................. 264/63, 66

[56] References Cited

U.S. PATENT DOCUMENTS

| 3,179,524 | 11/1965 | Hunter | 264/63 |
| 3,316,108 | 4/1967 | Blomberg | 264/63 |
| 3,413,232 | 11/1968 | Quinn | 264/63 |
| 3,549,315 | 12/1970 | Lester et al. | 264/63 |

FOREIGN PATENT DOCUMENTS

| 496,185 | 9/1953 | Canada | 264/63 |
| 492,577 | 9/1938 | United Kingdom | 264/63 |

*Primary Examiner*—Donald J. Arnold  
*Assistant Examiner*—John Parrish  
*Attorney, Agent, or Firm*—Wallenstein, Spangenberg, Hattis & Strampel

[57] ABSTRACT

Method for the manufacture of bonded and self-bonded bodies from certain particulate ceramic oxides or carbides by heating a shaped mixture containing the particulate ceramic material and from 1 to 10 percent of its weight of an additive which includes an organic moiety and an inorganic moiety and is non-polymeric in respect of the inorganic moiety, and undergoes decomposition on being heated under atmospheric pressure, said additive being exemplified by such organic compounds as aluminum-dibutyl phosphate; tris-(trimethylsiloxy)-aluminum; and diethyl-(triethoxy-silyl)-vanadate, to produce, by the thermal decomposition, an inorganic residue which remains substantially non-volatile up to temperatures at which the particles of the particulate ceramic material become self-bonding; the mixture containing the particulate ceramic material and additive being fired to a temperature of about 200° to about 600° C, at which the additive is thermally decomposed and the ceramic particles become bonded by the pyrolytic residue, and optionally further fired to a temperature between about 600° and about 1800° C at which the particles of the particulate ceramic material become self-bonding.

5 Claims, No Drawings

BONDED PARTICULATE CERAMIC MATERIALS AND THEIR MANUFACTURE

This application is a continuation-in-part of our application Ser. No. 230,998 filed Mar. 1, 1972, which itself was a continuation-in-part of our application Ser. No. 814,432 filed Apr. 8, 1969, which in turn was a continuation-in-part of our application Ser. No. 518,792 filed Jan. 5, 1966.

This invention relates to methods for bonding particulate oxide and carbide ceramic materials by firing processes, by which the materials are first bonded so that they form bodies of comparative low strength, and if these bodies are further heated to higher temperatures they become self-bonding through bridges between the particles. The exact nature of the bonds produced by the bridges is not fully understood. A number of explanations has been forthcoming, and they differ according to whether the bridge material is chemically identical with, or closely related to, the particulate ceramic material, or substantially different from the latter. In any case the bridges must be present in a sufficient number to confer on a body made of the particulate ceramic solids high strength characteristics.

As distinct from the ultimate self-bonding which imparts great strength to the self-bonded body, the first bonding, which will be referred to herein also as "low-strength bonding" produces ceramic bodies which, though being clearly less strong than the self-bonded bodies, are yet strong enough for handling and also for certain uses which do not require high strength, at least not initially. For example, such low-strength bodies can be used for making furnace linings. Ultimately, the high temperatures prevailing in the furnace in the actual use thereof will produce the self-bonding of the ceramic lining.

There exists, however, the problem of holding the ceramic particles together at the beginning of the firing process before even the state of formation of the low-strength bodies has been achieved. Most particulate ceramic solids, in particular those to which this invention relates, possess negligible adhesion properties. Thus, for example, a cylinder 22 mm in diameter and 20 mm high made by pressing moist 80 mesh silicon carbide disintegrates on drying, and larger bodies similarly made of the same material do not keep their shape even when wet. Methods have been devised, therefore, to hold the particles in close proximity and maintaining the desired shape of the body until sufficient strength is developed on heating. The most important conventional methods of this kind are: performance of the bonding operation in moulds; the use of a particulate ceramic material of small grain size, and the addition of a binder.

In the first of these methods the particulate material is shaped by pressure in a mould and heated under pressure until bonding or self-bonding is achieved. Though very high quality products can be obtained in this way the limitations of this method are obvious: moulds are costly, large or very intricate shapes are difficult to produce in moulds, the high temperatures required for the self-bonding of many particulate ceramic materials restrict greatly the choice of mould materials and impose difficult and costly operating conditions, e.g., the use of graphite moulds which have to be protected from oxidation in the thermal operation.

The use of a particulate ceramic material of small grain size has the advantage that the fine particles intermesh and adhere to one another better than coarser particles of the same material. They also become self-bonding at somewhat lower temperature. Fine grinding has been proposed, therefore, in some cases, e.g., quartz ground to $-10$ microns is said to permit slip casting of laboratory crucibles and other small-sized bodies which keep their shape in heating until self-bonding by sintering is achieved. This method is, however, restricted both by the high cost of fine grinding and by the limited sizes and shapes that will stand heating without disintegrating prior to sintering.

The addition of binders is the most commonly used procedure. The binders may be either temporary or permanent. Temporary binders provide low-temperature strength, the so-called "green strength", which permits handling of the body after shaping and helps to some extent in maintaining the shape until the required degree of bonding is achieved. Conventional temporary or "green strength" binders are, as a rule, organic glues (e.g., starch), resins and polymers, which have the advantage of leaving no residue on firing. Their main disadvantage is that the structure of the body is left very weak between the temperature at which the binders are destroyed, e.g., about 300° C, and the self-bonding temperatures which, as a rule, are in the range from 1000°–1600° C. This imposes limitations on size and shape of bodies and requires very careful firing.

Permanent binders include inorganic glues, e.g., sodium silicates, which are very convenient and therefore widely used but are not suitable for refractories and other products having to sustain high temperatures, owing to the sharp decrease in refractoriness and acid resistance due to the $Na_2O$ introduced by the binder. Silica gels and silicone resins, though they do not introduce $Na_2O$, are similar to the sodium silicate binders in that they leave a $Sio_2$ residue; they have certain disadvantages to which reference will be made below. Plastic clays are, generally, excellent binders when used in sufficient amount (10–20%). They confer "green strength" at a relatively low temperature and eventually bond strongly to the particulate solids at a lowered self-bonding temperature. It is this last property which is most detrimental in the manufacture of refractories. For example, silicon carbide which by itself withstands 1800° C cannot as a rule be used above 1400° C if bonded with clay.

Acids and acidic salts can be used as binders in the case of basic particulate ceramic materials such as various metal oxides, whose surface they attack whereby compounds are formed which act as temporary or even lasting bridges. Well-known examples are phosphoric acid and inorganic acid phosphates which, if used in proportions of 1% to 10% by weight, can bond magnesia, alumina and other materials, even silica. The addition of such acids or acid salts in many cases detrimentally affects the properties of the product, e.g., its refractoriness or water-resistance after firing; it also causes corrosion of moulds and other equipment used in the process. Analogous situations obtain with respect to the use of alkyl esters of phosphoric acid, such as methyl or ethyl phosphate, and amine salts of phosphoric acid such as dimethylamine phosphate, as shown in U.S. Pat. No. 2,072,212.

Still other binders are known for which high temperatures, in the range of about 1400°–1800° C, are required in order to achieve a reasonably proper bonding of certain particulate ceramic materials.

All these known methods, generally speaking, used each by itself or in any suitable combination, have made it possible to bond particulate ceramic solids in the manufacture of a wide variety of products by making green bodies which are further heated until the desired final bonding is achieved. A difficulty frequently encountered in such cases is to ensure the proper maintenance of the shape and strength of the body in the temperature range from about 200° C to about 400° C, i.e. above that in which green-strength bonding exists. At this higher temperature the shape or strength of the body can no longer depend on combustible or volatile additives, since these have already been eliminated, but the ultimate self-bonding does not yet take place. In general, this higher temperature range starts around 300° C and usually terminates (depending on the chemical composition, particle size and other properties of the particulate ceramic material) between 1000° and 1600° C. For the sake of convenience this temperature range from about 300° C up to the self-bonding temperature will be referred to herein as "critical". Normally, where conventional binders are used, a sufficient strength of the shaped body in the critical temperature range is achieved only at the price of a sacrifice in quality of the final product (e.g., where clay is used as a binder), or of high expenditure (e.g., by the use of expensive moulds), or of a high proportion of rejects through breakage or deformation (for example when bricks are stacked in a kiln).

The present invention has the object to provide a method of bonding particulate ceramic materials, especially those of the kind indicated above, in which a satisfactory strength of the shaped body can be achieved precisely in the critical temperature range and this without lowering the quality of either the low-strength body produced within the lower part of the critical temperature range, or the final self-bonded product, and without appreciably increasing the manufacturing costs. The invention also concerns low-strength bonded bodies as well as self-bonded high-strength bodies made by the method according to the invention.

For the purposes of this invention the strength of the low-strength bonded bodies and of the high-strength self-bonded bodies will be described in terms of cold crushing strength (CCS). Of course, there is no clear gap between the CCS of the low-strength bodies and that of the high-strength bodies, for the CCS increases as the firing temperature rises. Moreover, the CCS depends on the nature of the additive and of the ceramic particles. As the Examples below will show, the CCS of a bonded body fired at the lower temperatures of the first firing stage, i.e. at about 200° C, may be of the order of 150 kg/cm$^2$ and above, while the CCS of the same body, after firing to self-bonding temperature, may amount to a multiple thereof.

The invention, accordingly, consists in the manufacture of bonded bodies from particulate oxide or carbide ceramic materials which comprises heating to a temperature within the range of from about 200° C to about 600° C a pressure-shaped, non-plastic mixture containing the particulate ceramic material, from 0 to 6% of its weight of water, and from 1% to 10%, preferably not in excess of about 5%, of its weight of an additive which includes an organic moiety and an inorganic moiety and is non-polymeric in respect of the inorganic moiety, and undergoes decomposition on being heated under atmospheric pressure, characterized in that an additive is used which fulfills the following conditions:

not to boil below 350° C at 760 mm/Hg, to undergo thermal decomposition on being heated with the particulate ceramic material to a temperature in the range from about 200° C to about 400° C substantially without evaporating prior to the thermal decomposition; to leave behind upon decomposition an inorganic residue amounting to not less than 5% of the weight of the undecomposed additive, which residue remains substantially non-volatile up to temperatures at which the particles of the particulate ceramic material become bonded, or self-bonding, respectively.

The amount of additive employed in accordance with the invention is such that it does not form a matrix, which distinguishes the invention from all known matrix-bonding methods. At the temperature of from about 200° C to about 600° C at which the pressure-shaped mixture is heated, the additive is thermally decomposed and a low-strength ceramic body is produced. Optionally, this body may be fired further at a higher temperature for producing a self-bonded body of higher strength.

Where a bonded low-strength body obtained by the method of the invention is to be further fired for producing a self-bonded high-strength body, this second firing operation may be performed either as a direct continuation of the first firing stage, or entirely separately therefrom, even after storage and possibly at a different place.

The particulate ceramic materials which can be bonded by the practice of the method of the present invention can be selected from large numbers of known oxidic and carbide materials. They include silica; silicates of metals other than alkali metals, especially of alkaline earth metals, aluminum or iron such as mullite, cordierite, olivine, forsterite, enstatite or wollastonite; magnesia, alumina, zirconia, thoria, beryllia, ceria, titania; aluminates such as spinel; chromites such as $Cr_2O_3.FeO$; titanates such as $TiO_2.Me_nO_m$; and silicate molecular sieves such as faujasite, chabazite, etc.; and the carbides of silicon, tungsten, titanium, boron and tantalum.

In the practice of the present invention, the shaped mixture is initially fired at a relatively low temperature at which the additive is thermally decomposed. This temperature is, of course, variable, depending upon the particular additive or mixture of additives utilized. It may, for instance, be as low as about 200° C and as high as about 600° C. The thermal decomposition of the additive transforms the mixture of the particulate ceramic material and additive into bonded bodies whose strength is not very high, yet sufficient for the permanent stabilization of the shape initially imparted to the mixture (due allowance being made for shrinkage during firing, and for certain technical uses of such bodies). If higher strength is required, these bonded bodies are further fired at a higher temperature to bring about self-bonding of the particles of the particulate ceramic materials. The said higher temperatures are also variable, depending upon a number of factors, including the nature of the particulate ceramic materials, the particular additives utilized and the particular crushing strength sought in the final self-bonded bodies. While said higher temperatures may be as low as about 600° C to 800° C in certain special situations, generally speaking they will usually be at least 1000° C and, more commonly, will be in the range of about 1200° to 1600° C and may even go higher as, for instance up to 1700° or 1800° C.

The additives according to the invention as a rule also provide initial green strength of the shaped mixture, i.e. sufficient stability of shape even prior to their being heated to the temperature of the first firing stage (about 200° to about 600° C). It may, however, be preferable in some cases to add a conventional green-strength binder to the mixture of ceramic particles and additives before this is being shaped, as, for example, dextrines, sulfite lye, coal tar, carboxymethyl cellulose or smoked rubber. These green-strength binders usually decompose without leaving a residue, in the initial heating stage before the thermal decomposition of the additive occurs. The proportions of such green-strength binders, when used, are variable but, in general, they may range from somewhat about 0.5%, or even less, up to about 5% by weight of the particulate ceramic material to be bonded. In some cases, the mixtures may also include proportions of known permanent binders which are compatible with the additives used in accordance with the present invention and, of course, the mixture as a whole.

It is a feature of this invention that the mixtures of the particulate ceramic materials and the aforesaid additives, which are to be shaped, are non-plastic masses. The term "non-plastic" means that the masses do not flow under the low shear stresses usually employed when plastic masses are flowing. Quantitatively, for a non-plastic mass the value of its viscosity at unit, low, shear stress or at zero shear stress, as obtained by extrapolation, approaches infinity. This usually occurs at a low water content of the mass. For example, the relative viscosity of an aqueous suspension or slurry, in dependence of the volume concentration of the particles, frequently obeys certain relationships (see M. Mooney, J. Coll. Sci. 9 (1954), 89, 104, 263; and J. A. Waterman et al, J. of the I.R.I., May/June, 1967, p.168). In general, non-plastic masses of particulate ceramic materials, such as SiC, contain less than 16% $H_2O$ for monodisperse and less than 5.6% for polydisperse systems. For the bricks, batts, saggers, crucibles, etc., made in accordance with the present invention, not more than 6% $H_2O$ is employed, and usually between about 0.75 and 3%, in the non-plastic masses prior to forming or pressing and firing;

a. to prevent migration of binder or fines during forming or pressing;
   b. to prevent distortion after fabrication on removal from mould, and
   c. to prevent cracking during drying.

The additives utilized in accordance with the present invention are represented by the formula $$M(A_{x\ or\ x+1}Q_{x'})(A'R)_y(R')_z$$

wherein,
M is an element selected from the group consisting of metals and silicon;
A and A' are each O, S or N;
Q is P, P=O or P=S;
R and R' are each H, or a hydrocarbon, substituted hydrocarbon, organo-metallyl or -metalloxy radical, and R' may also be halogen;
$x$, $x'$ and $z$ are each an integer from zero to 5, and $y$ is an integer from zero to 8,
with the proviso that $y$ and $z$ may not both be zero; and A'R and/or R' can be bonded either to M or Q, and there may be more than one type of A'R and/or R' groups in the molecule. Generally speaking, in many or most of the additive compounds, there is at least one unsymmetrically bound metal or metalloid atom.

The hydrocarbon radicals represented by R and R' can be of aliphatic (including cycloaliphatic), aromatic, and araliphatic character, and comprise straight chain and branched chain alkyl (including cycloalkyl), alkenyl, phenyl, naphthyl, and alkyl substituted phenyl and naphthyl radicals illustrative of which are ethyl, methyl, n-propyl, isopropyl, butyl, isobutyl, amyl, isoamyl, hexyl, isohexyl, octyl, isooctyl, nonyl, isononyl, decyl, isodecyl, undecyl, dodecyl, tridecyl, tetradecyl, pentadecyl and hexadecyl; cyclohexyl, cyclooctyl; vinyl, allyl, methallyl, phenyl, benzyl, tolyl, cresyl, xylyl, isopropylphenyl, octylphenyl, nonylphenyl, naphthyl, methylnaphthyl and isopropylnaphthyl. In general, the individual hydrocarbon radical will usually contain from 1 to 18 carbon atoms, preferably from 1 to 8 carbon atoms. The substituents in the substituted hydrocarbon radicals may be hydroxyl, and halogen such as chlorine or bromine, but preferably chlorine where there is a halogen substituent.

The additives encompassed by said formula fulfil the aforementioned requirements such as: that they undergo thermal decomposition on being heated with the particulate ceramic material substantially without evaporating prior to the thermal decomposition, and that they are substantially non-reactive towards any of the other ingredients of the mixture.

For example, the following groups of compounds are illustrative of those which are useful as additives in the practice of the method according to the present invention:

I. Certain types of M-salts of organo-phosphoric or organo-phosphorous acids or their thio analogs in which the organic moiety is bound to the phosphorus in P—O—C, P—S—C or P—C bonds, and M is as specified above;

II. Certain types of organo-silicon and metallo-organo silicon compounds;

III. Certain types of organo-vanadium compounds;

IV. Certain types of metal alcoholates and thioalcoholates;

V. Certain types of organo-titanates and metallo-organo titanates;

VI. Certain types of organo-zirconium and metallo-organo zirconium compounds.

Some illustrative examples of additives which are useful in the practice of the present invention, which fall into the foregoing Groups, and their relationship to the foregoing formula are as follows:

| Group I | |
|---|---|
| (1) Mg di-isopropyl phosphate | |
| $Mg(OP=O)_2(O\ i\text{-}C_3H_7)_4$ | |
| M is Mg | |
| A and A' are O | x and x' are 2 |
| Q is P = O | y is 4 |
| R is i-$C_3H_7$ | z is zero |
| (2) Ti di-butyl phosphate | |
| $Ti(OP=O)_4(O\ C_4H_9)_8$ | |
| M is Ti | x and x' are 4 |
| A and A' are O | y is 8 |
| R is $C_4H_9$ | z is zero |
| Q is P = O | |
| (3) Al di-butyl phosphate | |
| $Al(OP=O)_3(O\ C_4H_9)_6$ | |
| M is Al | x and x' are 3 |
| A and A' are O | y is 6 |

-continued

Q is P = O
R is $C_4H_9$
z is zero

Group II

(1) Tris-(trimethyl siloxy)-Al
Al [O Si $(CH_3)_3]_3$
M is Al     x and x' are zero
A' is O     y is 3
    z is zero
R is [—Si $(CH_3)_3$], organo-silyl radical (2) Bene ethoxy disiloxane
Si $(OC_2H_5)_3$ [O Si $(OC_2H_5)_3$]
M is Si     x and x' are zero
A' is O     z is zero R is $\begin{cases} C_2H_5 \\ Si\ (OC_2H_5)_3, \text{organo-metalloxy radical} \end{cases}$    y is $\begin{cases} 3 \\ 1 \end{cases}$ (3) Diphenyl disilanol
Si $(C_6H_5)_2$ $(CH)_2$
M is Si     x and x' are zero
A' is O     y is 2
R is H     z is 2
R' is $C_6H_5$

Group III

(1) Ethoxy dichloro vanadane oxide
V (O) $(OC_2H_5)$ $Cl_2$
M is V     x' is zero
A and A' are O     x + 1 is 1
R is $C_2H_5$     y is 1
R' is Cl     z is 2

(2) Tris-(p-chlorophenyl)-vanadate
V (O) $(OC_6H_4\ Cl)_3$
M is V     x' is zero
    x + 1 is 1
A and A' are O     y is 3
R is $C_6H_4\ Cl$     z is zero

Group IV

(1) Na methyl butenolate
Na [O $CH_2$ — CH = C $(CH_3)_2$]
M is Na     x and x' are zero
A' is O     y is 1
R is $CH_2CH$ = $C(CH_3)_2$     z is zero (2) Allyl-bis (2,3-dichloropropyl) aluminate
Al $(OCH_2$ — CH = $CH_2)$ $(OCH_2\ CH\ Cl\ CH_2\ Cl)_2$
M is Al     x and x' are zero
A' is O     z is zero R is $\begin{cases} CH_2—CH=CH_2 \\ CH_2CH\ Cl—CH_2Cl \end{cases}$    y is $\begin{cases} 1 \\ 2 \end{cases}$

Group V

(1) Mg di(iso-propyl) titanate
Mg O [O Ti (O i-$C_3H_7)_2$]
    x' is zero
M is Mg     x + 1 is 1
A and A' are O     y is 1
    z is zero
R is [Ti (O i-$C_3H_7)_2$], organo-metalloxy radical (2) Bis-(trimethyl-silyl) titanate complexed with 8-hydroxy quinoline
Ti [O Si $(CH_3)_3]_2$ $(C_9H_7NO)_2$
M is Ti     x and x' are zero
A' is O     y is 2
    z is 2
R is [Si $(CH_3)_3$], organo-metallyl radical
R' is $C_9H_7NO$

Group VI

(1) Tetrabis-(triphenyl siloxy) zirconium
Zr [O Si $(C_6H_5)_3]_4$
M is Zr     x and x' are zero
A' is O     y is 4
R is triphenylsilyl     z is zero
[Si $(C_6H_5)_3$]

(2) Bis-(hydroxyethyl) di-propoxy zirconium
Zr (O $C_3H_7)_2$ $(C_2H_4OH)_2$
M is Zr     x and x' are zero
A' is O     y is 2
R is $C_3H_7$     z is 2
R' is $C_2H_4OH$ Illustrative examples of Group I compounds, in addition to those referred to above, are lithium bishydroxypropyl phosphate, cobalt-dibutyl phosphate, bismuth-dibutyl phosphate, ferrous-dibutyl phosphate, magnesium-dibutyl phosphate, sodium-dibutyl phosphate, stannous-dibutyl phosphate, lithium-diphenyl phosphate, potassium-dicresyl phosphate, cupric-di-isoamyl phosphate, magnesium-bis($\beta$-chloroethyl) phosphate, magnesium-iso-octyl phosphite, cobalt-diallyl phosphite, magnesium-dibutyl hypophosphate, calcium-bis-(2,3-dichloropropyl)-phosphate, magnesium-cresyl thiophosphate and sodium dimethyl thiophosphate.

Illustrative examples of Group II compounds, in addition to those referred to above, are tris-2-chloropropyl phenyl silicate, silicon tetrakis-(2,3-dichloropropyl)-phosphate and bis-(triethoxy-siloxy)-magnesium.

An illustrative example of Group III compounds, in addition to those referred to above, is diethyl-(triethoxysilyl)-vanadate.

Illustrative examples of Group IV compounds, in addition to those referred to above, are aluminum butoxy glycolate, potassium thiophenolate and potassium thiooctanolate (octylmercaptanolate).

Illustrative examples of Group V compounds, in addition to those referred to above, are magnesium di-isobutyl titanate, bis-(trimethyl-siloxy) di-isopropoxy titanium and tetrakis (triphenylsiloxy) titanium.

Illustrative examples of Group VI compounds, in addition to those referred to above, are trispropoxy butoxy zirconium, bis(hydroxyethyl) di-butoxy zirconium and bis(hydroxypropyl) di-propoxy zirconium.

Regarding the foregoing groups of additives which are used according to the present invention, some additional observations may be made.

GROUP I

The additives of Group I overcome certain deficiencies of phosphoric acid or inorganic acid phosphates previously used. For example, the bonded bodies produced by heating the particulate ceramic material to a temperature above the temperature of thermal decomposition of the additive are generally significantly more stable towards hydrolysis than are bodies produced in a similar manner with phosphoric acid or inorganic acid phosphates added to the particulate material. Owing to this fact, preliminarily formed bodies can be stored prior to their subsequent final firing without danger of their disintegration as a result of contact with moisture.

Most of the compounds of this group, as chemical compounds, are known. In any case, all of them can be prepared by known methods such as described by Kosolapoff, "Organophosphorus Compounds", New York 1950, and Van Waser (Editor) "Phosphorus and its Compounds", New York 1961.

GROUP II

The organic moiety of the compounds of Group II may consist, for example, of alkyl, aryl, alkaryl, alkenyl radicals, substituted alkyl, alkaryl, alkenyl or aryl radicals, or organo-metallo groups, which may be identical or different. These compounds may be used as such, or in solution, or in combination with others in this or in other Groups, so as to provide that system which is most suitable in each case. Where these monomeric organo-silicon compounds are used in combination with other monomeric additives, it is possible in some cases to employ some of the former compounds which in themselves undergo substantially complete volatilization prior to decomposition, provided that these volatile compounds undergo significant interaction with the second monomer so that a substantial part of the combined monomers, considered as a whole, decomposes thermally prior to volatilization. As compared with resinous organo-silicon polymers, the additives used according to the present invention are less costly, easier to handle and more readily decomposable in the heat.

Most of the compounds of this Group II, as chemical compounds, are known. In any case, all of them can be prepared by known methods such as are reported by Eaborn, "Organosilicon Compounds", London, 1960.

GROUP III

In the compounds of Group III the organic moiety may consist of the same or different substituted or unsubstituted alkyl, aryl, alkaryl, alkenyl or organometallo radicals.

GROUP IV

The organic moiety of the Group IV compounds may consist of saturated or unsaturated aliphatic, aryl or aralkyl radicals. It may even be polymeric, e.g., constituted by such natural polymers as starch or cellulose. Of course, the basic condition has always to be observed that the pyrolitic inorganic residue must amount to at least 5% of the weight of the undecomposed additive, which limits the molecular size of the organic moiety. Conventionally substituted compounds, e.g., by hydroxyl or halogen, are deemed to be included in this group. The terms "alcohol" and "thio-alcohol" are intended to include phenols and thiophenols, respectively. All the compounds in this Group IV mentioned in the present specification are known, apart from allyl-bis-(2,3-dichloropropyl)-aluminate. This latter compound can be prepared in analogy to the indications given by Mehrotra, J. Indian Chemical Society, Volume 31, pp. 85-90 (1954).

GROUP V

The compounds of Group V can be prepared by the method described by M. F. Lappert and G. J. Leigh (editors) "Developments in Inorganic Polymer Chemistry" (New York, 1962). In these compounds the organic radicals may be the same or different saturated or olefinically unsaturated aliphatic hydrocarbon radicals which may carry conventional substituents such as hydroxyl, halogen or the like.

GROUP VI

The compounds of Group VI can be prepared by the method described by Mehrotra, J. Indian Chemical Society, Volume 31, pp. 904-10 (1954). Their organic moiety may comprise several identical or different alkyl, alkenyl, aryl or alkaryl groups, or organo-metallo radicals.

It may be noted, in connection with the types of additives of Group IV, that it has heretofore been suggested, as disclosed in Bormann British Pat. Nos. 492,576 and 492,577, to employ, as binders, certain organic aluminum salts such as the formate, bioxalate, tartrate, lactate and acetotartrate, as well as aluminum alcoholates. These binders are used in the formation of ceramic bodies from "paste-like", i.e. plastic masses of the particulate ceramic material. The binding properties are attributed by Borman to the finely divided $Al_2O_3$ formed by thermal decomposition of the organic aluminum salt, of which at least a certain amount is necessary to produce the required amount of fine $Al_2O_3$. While Bormann provides no working examples showing the amount of aluminum compounds utilized, it is clear that a certain concentration of finely divided aluminum oxide formed from the organic aluminum compound employed as the binding agent is required within the structure of the sintered body if the body is to be possessed of substantial strength. Owing to this requirement a large amount of the aluminum compound must be used since the $Al_2O_3$ residue obtained, for example, from aluminum formate is only 17% by weight of the formate, and even much smaller in the case of other compounds (e.g. tartrate, lactate, etc.). It follows, therefore, that to form a ceramic body having 5% by weight of ultra fine $Al_2O_3$ decomposition, requires about 29% Al-lactate or about 23% Al-acetotartrate. In view of the relatively low solubilities in water (aluminum lactate about 20%; aluminum tartrate about 40%), the amount of aqueous medium required in the Bormann system is considerable, leading to a paste-like or plastic consistency, as Bormann states explicitly. The large amount of organic salt and the high proportion of water in the mixture are clearly undesirable.

Insofar as Bormann uses salts of carboxylic acids, the present invention is distinguished from his teachings in that the inorganic-organic compounds employed in accordance with the invention are not carboxylic acid salts. Moreover, the invention is also distinguished from Bormann insofar as he uses aluminum alcoholates as binders, which is mentioned by Bormann as one possibility. This is so, because in the practice of the invention, the amount of the additive utilized is in the range of 1 to 10% by weight, and preferably not more than 5% by weight of the ceramic material, which is radically lower than the amount used by Bormann for all his binders. In addition, pursuant to the present invention very low amounts of water, in the range of zero to approximately 6% are used, in contrast to the large proportions of water which Bormann necessarily requires to form his initial paste-like masses or slips. The small proportion of water used pursuant to the present invention is of advantage in preventing or reducing migration of the components of the mixture during pressing, in preventing or reducing distortion after fabrication on removal from moulds, and in preventing or reducing cracking during drying. The requirement in Bormann for the presence of substantial proportions of fines also necessitates prolonged grinding, resulting in a further economic disadvantage. In any event, the proportions of water employed in accordance with the present invention are such that the ceramic masses which are formed with the particulate ceramic materials and the additives are non-plastic, as pointed out above.

Quite surprisingly it has been found in accordance with the invention that the stipulated low water content of 0-6% by weight of the ceramic material is critical, and bodies made from particulate ceramic materials pursuant to the present invention have been demonstrated to have substantially greater strength than those made by the procedure of said Bormann patents. Such demonstration is to be found in Example 33 below.

As indicated above, the additives which are used in accordance with the present invention are sharply distinguishable from those binders which have heretofore been suggested for use in the bonding of particulate ceramic materials. Thus, in the case of silicones (e.g. as shown in U.S. Pat. No. 2,641,044), the inorganic moiety thereof is polymeric, whereas, in the additives of the present invention, it is essential that the inorganic moiety be non-polymeric. Again, as in the case of the alkyl esters and amine salts of phosphoric acid, used as shown in U.S. Pat. No. 2,072,212, none of said compounds contains both an organic moiety and a non-polymeric inorganic moiety, which is one of the (several) requirements of the additives of the present invention. It is also known, as shown in U.S. Pat. No. 3,244,540, to produce refractory bodies by providing a mixture containing particles of aluminum or an aluminum base alloy, plastic clay, a fluxing agent in the form of certain metal oxides or hydroxides or precursors thereof such as organic and inorganic salts such as acetates, benzoates, silicates, sulfates, etc., or trialkyl tin oxides and lead silicate and tabular alumina, shaping the mixture in a body, drying and firing, the aluminum being converted to alumina during the process in which the firing is carried out in an oxidizing atmosphere. Apart from the fact that fluxing and binding are two distinctly different operations and have distinctly different functions, and the different procedures of that patent and the present invention, the said fluxing agents are clearly distinguished from the additives used according to the present invention and do not satisfy the defined requirements of said latter additives.

The invention is also clearly distinguished from the disclosure in U.S. Pat. Nos. 3,342,627 (Paxton) and 3,309,433 (Roberts). Paxton teaches a method of improving the oxidation resistance of a porous carbon body, which comprises impregnating said body with a fluid molten composition of an inorganic phosphate under pressure of from about 125 to 500 atmospheres and a temperature from about 400° to 1500° C. In the practice of this method, the substrate is a coherent, self-supporting body which is merely impregnated to impart to it certain desired chemical qualities. By the impregnation the macro voids of the porous body are filled and, in addition, there occurs a so-called intercalation which consists essentially in the penetration of the impregnating agent into the lattice structure resulting in an expansion of the latter. Thus, for example, it is known that as a result of intercalation, the strong 3.35 Angstrom band which is characteristic of pure graphite in its X-ray pattern, is almost completely eliminated, and a new band at 11.10 Angstroms appears (see Jean Lalancette and Jeannine Lafontaine, J.C.S. Chem. Comm., 1973, p.815). Thus, an impregnation of graphite, as practised by Paxton, brings about a structural change of the particles as a result of the intercalation of the impregnating agent and the particles.

The impregnating agent used by Paxton is a wholly inorganic substance and it does not act as binder seeing that the substrate is a coherent body. Against this, in accordance with the invention, the material is a particulate ceramic mass from which a coherent body is made with the aid of metallo-organic or silico-organic additive acting as binder. This operation thus affects the physical state of the starting material while having no appreciable influence on the chemical properties thereof. There is also no intercalation of the binder and the ceramic particles which is excluded by the very nature of the latter. It is thus clear that the teachings of Paxton concern an entirely different art than the invention, and no predictions were possible from the chemical modification of an existing carbon body by means of an inorganic impregnating agent, which modification is at least in part to be attributed to intercalation, on the capacity of the metallo-organic or silico-organic additive employed in accordance with the invention to bond ceramic particulate material.

Roberts teaches the production of graphite artifacts from graphite or a graphitisable powder. According to Roberts, said powder is mixed with a wholly organic binder and the mixture is pressed and subjected to heat treatment. This method is but a classical matrix bonding in which the binder is used in such an amount that upon pressure-forming of the green body the binder substantially fills out the voids between the particles, forming a substantially coherent matrix which holds the particles. In addition, there is also an intercalation effect. In contrast, in accordance with the invention, there is no intercalation, no matrix is formed, and the binder molecule has an organic and an inorganic moiety.

The invention is furthermore also clearly distinguished from the teachings in U.S. Pat. No. 3,549,315 (Lester). Lester teaches to produce certain mixed oxides, mainly in the form of lumps, by a series of operations comprising mixing in an aqueous medium two or more different metal oxides and a deflocculant, separating the aqueous phase and firing the residual slip. The deflocculant is a wholly organic substance which serves to produce a stable suspension of solids and does not act as a binder. It is employed in an amount not exceeding 2% of the total weight of the solids. Put in other words, Lester is concerned with a slip casting operation in which an initially produced slip, which is by definition a plastic composition, is subjected to sintering.

As already observed above in connection with the Bormann teachings, it was surprising to find in accordance with the invention that by employing non-plastic starting compositions comprising certain inorganic/organic additives, it is possible to obtain in accordance with the teachings of this invention ceramic bodies whose strength is superior to that of bodies obtained from a slip casting operation. The invention could thus in no way have been anticipated from Lester's teachings, all the more so when having regard to the fact that Lester does not use any binder at all but merely a wholly organic substance as deflocculant.

The mechanism of action of the additives according to the present invention is not yet fully understood, and it is possible that it is not the same in all cases. It would appear that, after their thermal decomposition, the inorganic residue acts as a binder in the critical temperature range above the temperature of decomposition of conventional green-strength binders and up to the self-bonding temperature. This binder is a permanent one if the bonded body is not further fired to the self-bonding stage, but whether or not the inorganic residue constitutes a true binder (i.e. participates in the formation of bonding bridges) in the final self-bonded product is, in the context of the present invention more or less a terminological question, and it is a matter of hypothesis whether in the last resort the additives are termed "binders" or "bonding promoters". What matters is the fact that the additives according to the present invention impart to the bodies being fired an enormously increased strength in the aforesaid critical temperature range, and still more in the final self-bonded state.

The additives may be used singly or in any desired suitable combination, such as mixtures of two or three or more thereof. They may be applied to the particulate ceramic material in the form of solutions emulsions or suspensions in water or organic solvents, or they may directly be mixed in a finely divided state with the particulate ceramic material. If desired, the additives may be used in the form of complexes. The water or organic solvent of the solutions, emulsions or suspensions evaporates in the heating process.

The additive may be added to the particulate ceramic material before the body to be fired is shaped, or the shaped body may be impregnated with the additives, if necessary dissolved in a suitable solvent, but in any case before the body is heated to a temperature at which the additive would decompose. The object of the invention can be achieved only if the additive is heat-decomposed in situ and the grains of the particulate ceramic material are tightly packed. The effect of increasing the strength of the body in the critical temperature range and of producing high-strength self-bonded bodies cannot be achieved if an inorganic substance, identical with the residue of the thermal decomposition of the additive but produced extraneously, is admixed as such to the particulate ceramic material, nor if the thermal decomposition is carried out in a loose mixture of the particulate ceramic material with the additive. The following experiment serves to illustrate these conditions:

Three bodies were prepared by moulding from a mixture of flint clay grog and 30% of its weight of plastic clay, and all were fired at 1000° C, whereafter their cold crushing strength was determined.

A: no additive was admixed to the grog-clay mixture;

B: 5% by weight of magnesium dibutyl phosphate (an additive according to the invention) was added to the mixture before the moulding;

C: 2.5% by weight of magnesium pyrophosphate (being the inorganic residue left in the thermal decomposition of magnesium dibutyl phosphate) was added to the mixture before the moulding; A fourth body was prepared as follows:

D: 5% by weight of magnesium dibutyl phosphate was added to the loose mixture of flint clay grog and plastic clay, then the latter was heated to 600° C whereby the magnesium dibutyl phosphate was heat-decomposed, thereafter the mixture was moulded and the body was fired at 1000° C.

The crushing strength of the four fired bodies was as follows:

| Fired body | Cold crushing strength kg/cm$^2$ |
| --- | --- |
| A | 300 |
| B | 600 |
| C | 300 |
| D | 250 |

The result of this experiment is clear: only the presence of the additive in the moulded body in the course of firing of the latter significantly increases the crushing strength of the fired product.

Though compounds comprising additives coming under the definition of the additives used pursuant to the present invention have a promoting effect on the bonding of particulate ceramic solids, this effect may in some cases be small or even completely masked by other effects. Thus, for example, compounds that decompose catalytically or at a very fast rate are obviously less desirable since the rapidly evolving gas formed out of the organic moiety may somewhat weaken the structure of the body. Furthermore, the pyrolytic residue may affect the composition and properties of the product in the critical temperature range and the self-bonding stage. Thus, additives leaving residues strongly bonding the ceramic particles should be employed when bodies having a high strength are to be manufactured at low self-bonding temperatures. For products which are to have a uniform composition, the proportion of the additive should be low, or an additive should be selected whose pyrolytic residue is chemically the same as that of the particulate ceramic material which is being bonded. Further, for every additive there is an optimal heating rate which is characteristic for a given particulate ceramic material to be bonded. If this heating rate is fixed by other manufacturing considerations, simple preliminary tests will establish the additive best adapted to utilize for the particular given heating rate. Furthermore, compounds leaving an amount of pyrolytic residue less than 5% by weight of the additive have been found to be of small value.

The method according to the invention is of especial importance for the manufacture of ceramics and refractories, for making self-bonded pellets or briquettes of ores to be subjected to metallurgical processes, and for other similar purposes.

The invention is illustrated by the following Examples to which it is not limited. In the Examples, indications of parts are by weight, those of temperature are in degrees centigrade, and the figures of cold crushing strength (CCS) are expressed in kg/cm$^2$ at room temperature and are averages.

EXAMPLE 1

Manufacture of flint clay bricks

Three parallel batches were prepared:

1. 100 parts of graded flint clay grog particles (-4 mm size) mixed with one part of dextrine dissolved in 5 parts of water.

2. 100 parts of the same flint clay grog mixed with one part of dextrine, 5 parts of titanium dibutyl phosphate and 5 parts of water.

3. 100 parts of the same flint clay grog mixed with 5 parts of titanium dibutyl phosphate and 5 parts of water.

From each batch, bricks (23 × 11.5 × 6.5 cm) were made by moulding in an hydraulic press at a pressure of 1 ton/cm$^2$. The bricks were dried at 110° and each batch of bricks was divided into three groups, which were fired at 200°, 600° and 1600°, respectively.

The crushing strength of these bricks is indicated in the following Table 1.

Table 1

| Firing temperature | | Cold Crushing Strength | | |
| --- | --- | --- | --- | --- |
| | | 200° C | 600° C | 1600° C |
| Batch | 1) | 150 | 50 | 600 |
| | 2) | 150 | 315 | 600 |
| | 3) | 5 | 225 | 600 |

The Table shows that bricks containing dextrine as a green-strength binder but no additive according to the invention had a very low crushing strength when fired to 600°, which is in the critical temperature range for flint clay. The admixture of the additive without dextrine provided a very low strength at the lowest firing temperature but a satisfactory strength in the critical temperature range. The admixture of both dextrine and the additive provided both good low-temperature strength and good strength in the critical temperature range. After being fired at the sintering temperature of 1600° all three groups of bricks had the same crushing strength.

EXAMPLE 2

Manufacture of corundum kiln supports

These supports for kiln furniture are in the form of bars 4 × 4 × 12 cm. The corundum used for this purpose contained 96% of $Al_2O_3$, 3% of $TiO_2$, 0.3% of $Fe_2O_3$, 0.2% of CaO + MgO and a small amount of other impurities. The particle size of this material was −8 + 325 mesh.

Two batches were prepared:

1. 100 parts of corundum mixed with 0.5 parts of dry sulfite lye dissolved in 5 parts of water.
2. 100 parts of corundum mixed with 0.5 part of dry sulfite lye and 5 parts of magnesium di-isopropyl phosphate dissolved in common in 5 parts of water.

From both batches, supports were made in steel moulds at 1 ton/cm². The supports were dried at 110° and divided into groups which were fired at 400°, 600°, 800°, 1000° and 1400°, respectively. The crushing strength of the fired bars is tabulated in the following Table 2.

Table 2

| Firing temperature | | 110° | 400° | 600° | 800° | 1000° | 1400° |
|---|---|---|---|---|---|---|---|
| | | Cold Crushing Strength | | | | | |
| Batch | 1) | 80 | 20 | 15 | 40 | 200 | 850 |
| | 2) | 80 | 260 | 350 | 400 | 600 | 1250 |

Similar results were obtained when magnesium isooctyl phosphite, $Mg(i-C_8H_{17})PO_3$, was used as the additive instead of magnesium di-isopropyl phosphate.

In this case the additive according to the invention achieved a decisively improved crushing strength in the critical temperature range.

EXAMPLE 3

Manufacture of bauxite bricks

The bauxite used for these bricks was from British Guiana, calcined, containing 86% $Al_2O_3$ and of particle size −8 + 200 mesh. It was desired to obtain a strong brick of high refractoriness, and, therefore, the amount of plastic clay — low in alumina — to be added as a binder had to be reduced to a bare minimum.

90 parts of bauxite were mixed with 10 parts of plastic ball clay and 6 parts of water. From this mixture, a number of bricks of 23 × 11.5 × 6.5 cm were moulded in a steel mould at a pressure of 1 ton/cm². The bricks were dried at 110°, to ensure the complete removal of water, and separated into three groups. One group of bricks was left as it was. The bricks of the second group were soaked in a saturated benzene solution of tris-trimethyl siloxy aluminium and those of the third group with a saturated benzene solution of tetrakis-triphenyl siloxy zirconium. The bricks of the second and third group absorbed an amount of solution corresponding to about 2 parts of additive per 100 parts of bauxite and clay. The soaked bricks were dried at 80°, for evaporating the benzene.

Several bricks from each group were subjected to firing at 400°, 1000° and 1400°, respectively. The cold crushing strength of these bricks is stated in Table 3.

Table 3

| Firing temperature | | 400° | 1000° | 1400° |
|---|---|---|---|---|
| | | Cold Crushing Strength | | |
| | 1) | 200 | 230 | 350 |

Table 3-continued

| Firing temperature | | 400° | 1000° | 1400° |
|---|---|---|---|---|
| | | Cold Crushing Strength | | |
| Batch | 2) | 220 | 430 | 550 |
| | 3) | 230 | 380 | 520 |

EXAMPLE 4

Production of magnesia bricks

The material used for production of these bricks was sintered magnesia, containing 98% of MgO and 0.4% of $Cr_2O_3$. Two batches were prepared:

1. 100 parts of magnesia (−20+200 mesh) mixed with 3 parts of coal tar.
2. 100 parts of magnesia mixed with 3 parts of coal tar and, as an additive, 5 parts of diethyl-(triethoxysilyl) vanadate,

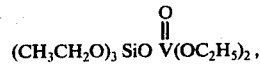

dissolved in 5 parts of kerosene.

The bricks were moulded in an hydraulic press at a pressure of 500 kg/cm² and fired successively at 200°, 600°, 1000°, 1400° and 1600°. Results of cold crushing strength are given below:

Table 4

| Firing temperature | | 200° | 600° | 1000° | 1400° | 1600° |
|---|---|---|---|---|---|---|
| | | Cold Crushing Strength | | | | |
| Batch | 1) | 185 | 20 | 96 | 170 | 400 |
| | 2) | 185 | 523 | 706 | 1050 | 1150 |

Similar results were obtained when a kerosene suspension of bis-(trimethoxy-siloxy)-magnesium was used as an additive.

EXAMPLE 5

Manufacture of quartz bricks

Bricks for acid resistant linings were made of quartz sand −20 + 120 mesh size. Three batches were prepared:

1. 100 parts of quartz sand mixed with 1 part of dry sulfite lye dissolved in 5 parts of water.
2. 100 parts of quartz sand mixed with 2 parts of lime (CaO) and 1 part of dry sulfite lye dissolved in 5 parts of water.
3. 100 parts of quartz sand mixed with 4 parts of aluminium-dibutyl phosphate as an additive and 1 part of dry sulfite lye dissolved in 5 parts of water.

A number of bricks of 30 × 15 × 8 cm were moulded from each batch at a pressure of 300 kg/cm², dried at 110° and subjected to firing successively at 200°, 600°, 800° and 1400°. The cold crushing strength was as indicated in Table 5.

Table 5

| Firing temperature | | 200° | 600° | 800° | 1400° |
|---|---|---|---|---|---|
| | | Cold Crushing Strength | | | |
| Batch | 1) | 150 | 20 | cracked | |
| | 2) | 160 | 100 | 150 | 480 |
| | 3) | 150 | 160 | 300 | 450 |

The bricks of batches 2 and 3 fired at 1400° were subjected to corrosion tests by being submerged in aqueous acid solutions for various lengths of time. In general, the bricks of batch 2 showed considerable weakening and even spontaneous crumbling, whereas those of batch 3 retained their original strength.

EXAMPLE 6

Experimental production of porcelain slabs

Slabs of 4 × 4 × 20 cm were produced from ground porcelain rejects (−150 mesh). Two parallel batches were prepared:

1. 100 parts of ground porcelain mixed with 0.5 part of commercial carboxymethyl cellulose dissolved in 5 parts of water.
2. The same mixture as in batch 1 with the further addition of 5 parts of magnesium-dibutyl phosphate as an additive.

Several slabs were formed by dry-moulding in an hydraulic press at a pressure of 500 kg/cm$^2$, dried in oven at 110° and then subjected to firing up to 1250°.

The cold crushing strength was as indicated in Table 6.

Table 6

| Firing temperature | Cold Crushing Strength | | | |
|---|---|---|---|---|
| | 200° | 400° | 800° | 1250° |
| Batch 1) | 70 | 30 | 25 | 600 |
| Batch 2) | 70 | 190 | 250 | 630 |

EXAMPLE 7

Experimental production of procelain slabs

The procedure was carried out as described in Example 6, but dextrine was used in place of commercial carboxymethyl cellulose, and lithium bis-hydroxypropyl phosphate as an additive. The crushing strengths were as stated in Table 7.

Table 7

| Firing temperature | Cold Crushing Strength | | | |
|---|---|---|---|---|
| | 200° | 600° | 800° | 1400° |
| Batch 1) | 170 | 90 | 50 | 525 |
| Batch 2) | 170 | 250 | 325 | 675 |

EXAMPLE 8

Manufacture of corundum bodies

Test cylinders of 5 cm diameter and 5 cm height were made from the same corundum as used in Example 2. They were required to possess high strength and good refractoriness up to 1600°. Two batches were prepared:

1. 100 parts of corundum mixed with 0.5 part of sulfite lye and 4 parts of sodium metasilicate dissolved in 6 parts of water.
2. The same mixture as in batch 1) but without sodium metasilicate.

The bodies were formed in an hydraulic press at a pressure of 1 ton/cm$^2$ and dried at 110°. The bodies of batch 2) were then soaked with a kerosene solution of tris-2-chloropropyl phenyl silicate as an additive. The amount of additive absorbed by the bodies corresponded approximately to 4 parts per 100 parts of corundum.

The bodies of both batches were then subjected to heating successively at 400°, 1000°, 1400° and 1600°. In both cases, the cold crushing strength after firing at these various temperatures was satisfactory. However, at 1600°, the bodies of the first batch were considerably deformed owing to the formation of a glassy phase, whereas those of the second batch showed no indication of a melt and kept their original dimensions.

EXAMPLE 9

Production of magnesia bricks

The method was carried out as described in Example 4, but magnesium di-butyl hypophosphate (Mg(C$_4$H$_9$O)$_2$P$_2$O$_4$) was used as an additive. After firing the crushing strength of the bricks was as follows:

| Temperature | 200° | 400° | 600° | 1400° | 1700° |
|---|---|---|---|---|---|
| Crushing strength | 150 | 320 | 610 | 1080 | 1300 |

EXAMPLE 10

Manufacture of silicon carbide batts

Batts of 38 × 45 × 2.5 cm for use in kiln furniture were made from silicon carbide of particle size −14 + 400 mesh. Three parallel batches were prepared:

1. 100 parts of SiC were mixed with 1 part of dextrine and 5 parts of water.
2. The same mixture as in batch 1) with the further addition of 5 parts of calcium bis-(2,3-dichloropropyl phosphate) as an additive.
3. 100 parts of SiC were mixed with 15 parts of ball clay and 5 parts of water.

The batts were formed in a steel mould by hand ramming, dried at 110° and then fired successively at 200°, 600°, 800°, 1000° and 1400°. Their cold crushing strength was determined on small pieces cut from the batts with a diamond wheel. It was as indicated in Table 8.

Table 8

| Firing temperature | Cold Crushing Strength | | | | |
|---|---|---|---|---|---|
| | 200° | 600° | 800° | 1000° | 1400° |
| Batch 1 | 75 | | Cracked | | |
| Batch 2) | 75 | 310 | 450 | 670 | 1005 |
| Batch 3) | 150 | 280 | 390 | 450 | 650 |

From batts prepared from batches 2 and 3, several bars, 5 cm wide, were cut and subjected to a test of bending under load at 1600°. Under the conditions of the test, the bars of batch 2 retained their form, while those of batch 3 were deformed.

EXAMPLE 11

Manufacture of silicon carbide supports

Supports for kiln furniture were made from silicon carbide of particle size −8 + 270 mesh in the form of prisms of 4 × 4 × 12 cm. Two parallel batches were prepared:

1. 100 parts of SiC were mixed with 3 parts of coal tar.
2. The same mixture as in batch 1 with the further addition of 5 parts of dichloro-dibutoxy titanium dissolved in 5 parts of kerosene as an additive.

The supports were moulded at a pressure of 1 ton/cm$^2$ and fired slowly up to 1400°. The crushing strength of the fired bodies is tabulated in Table 9.

Table 9

| Firing temperature | Cold Crushing Strength | | | |
|---|---|---|---|---|
| | 200° | 400° | 800° | 1400° |
| Batch 1) | 75 | 30 | 20 | 210 |
| Batch 2) | 75 | 370 | 700 | 1190 |

EXAMPLE 12

Manufacture of porcelain bodies

From porcelain ground to a particle size of −200 mesh, two batches were prepared:

1. 100 parts of porcelain were mixed with 5 parts of a 10% solution of smoked rubber in xylene.
2. The same mixture as in batch 1 with the further addition, as the additive, of 5 parts of sodium-methyl butenolate (NaOCH$_2$— CH = C (CH$_3$) CH$_3$) dissolved in 5 parts of butyl alcohol.

Cylindrical bodies of 5 cm diameter and 5 cm height were moulded at a pressure of 300 kg/cm$^2$. The bodies were heated at 100 − 120° to drive off the solvents and then fired. Their crushing strength is stated in Table 10.

Table 10

| Firing temperature | Cold Crushing Strength | | | |
|---|---|---|---|---|
| | 400° | 800° | 1000° | 1250° |
| Batch 1) | 60 | 40 | 100 | 610 |
| Batch 2) | 210 | 305 | 420 | 650 |

EXAMPLE 13

Manufacture of mullite bricks

Fused mullite, ground to a particle size of −8 mesh, was used to make bricks of 23 × 11.5 × 6.5 cm. Three parallel batches were prepared:

1. 100 parts of fused mullite were mixed with 0.5 parts of smoked rubber dissolved in 5 parts of benzene.
2. The same mixture as in batch 1 with the addition of 5 parts of silicon tetrakis (2,3-dichloropropyl) phosphate [(O = P (OCH$_2$CHClCH$_2$Cl)$_2$O)$_4$] Si as an additive.
3. The same mixture as in batch 1 with the additive of 5 parts of magnesium iso-propyl titanate Ti(i—C$_3$H$_7$O)$_2$.O Mg O.

The bricks were moulded at a pressure of 1 ton/cm$^2$, dried at 110° and fired at various temperatures up to 1700°. The cold crushing strength is tabulated in Table 11.

Table 11

| Firing temperature | Cold Crushing Strength | | | | |
|---|---|---|---|---|---|
| | 200° | 400° | 800° | 1400° | 1700° |
| Batch 1) | 75 | 43 | 17 | 120 | 520 |
| Batch 2) | 75 | 120 | 350 | 630 | 710 |
| Batch 3) | 75 | 370 | 530 | 600 | not determined |

Similar results were obtained when silicon-dibutyl phosphate was used as the additive.

EXAMPLE 14

Production of magnesia bricks

Sintered magnesia of a particle size of −10 + 270 mesh was used for making bricks. Three batches were prepared:

1. 100 parts of magnesia were mixed with 0.5 part of commercial carboxymethyl cellulose dissolved in 5 parts of water.
2. The same mixture as in batch 1 with the further addition of 5 parts of magnesium cresyl thiophosphate as an additive.

Several bricks were moulded from each batch at a pressure of 1 ton/cm$^2$, dried at 110° and fired up to 1400°. The crushing strength is tabulated in Table 12.

Table 12

| Firing temperature | Cold Crushing Strength | | | |
|---|---|---|---|---|
| | 200° | 400° | 1000° | 1400° |
| Batch 1) | 150 | 30 | 30 | 100 |
| Batch 2) | 150 | 220 | 450 | 700 |

EXAMPLE 15

Manufacture of plates of white corundum

White fused alumina (corundum) containing 99.6% Al$_2$O$_3$ was used for the manufacture of square plates for electric kilns. The particle size was −8 + 325 mesh. Two batches were prepared:

1. 100 parts of white corundum were mixed with 5 parts of a 10% solution of smoked rubber in xylene.
2. The same mixture as in batch 1 with the further addition of 5 parts of allyl—bis—2,3 dichloropropyl aluminate, Al (OCH$_2$CH = CH$_2$) (OCH$_2$CHCl.CH$_2$Cl)$_2$ as an additive.

The plates, 10 × 10 × 2 cm, were moulded at a pressure of 500 kg/cm$^2$ and heated in an oven at 100°–150° until the solvent had evaporated, then they were fired at various temperatures up to 1400°. The crushing strength is indicated in Table 13.

Table 13

| Firing temperature | Cold Crushing Strength | | | |
|---|---|---|---|---|
| | 200° | 400° | 800° | 1400° |
| Batch 1) | 60 | 20 | 12 | cracked |
| Batch 2) | 60 | 210 | 390 | 650 |

Similar results were obtained when 4 parts by weight of aluminium butoxy glycolate were used as additives. The resulting plates retained the purity of the original alumina. If these additives are used in the presence of water, the plates obtained are weak and cracked, and therefore, the presence of water or excessive atmospheric moisture should be avoided.

EXAMPLE 16

Manufacture of silica glass crucibles

Crucibles of 1 liter capacity and 0.5 cm wall thickness were made by three different methods.

1. Silica glass was wet ground in a pebble mill for about 300 hours until the average particle size was 5 microns. The dry silica was mixed with a solution of smoked rubber in xylene in the proportion of 1 part of rubber and 5 parts of xylene for 100 parts of silica. Crucibles were formed by moulding at a pressure of 300 kg/cm$^2$ and heated at 100° to evaporate the solvent. The dry crucibles were carefully handled and placed in a high-temperature kiln, where they were fired to sintering (about 1500°).
2. Silica glass ground to a particle size of −28 + 250 mesh (−595 to + 63 microns) was moulded into crucibles as described in the preceding paragraph. After drying and firing at about 400° the crucibles collapsed.
3. Silica glass ground to a particle size of −28 + 250 mesh was mixed with a solution of smoked rubber in xylene in the proportion of 1 part of rubber and 5 parts of xylene per 100 parts of silica. To this mixture, 5 parts of di-phenyl di-silanol were added as an additive. The crucibles were moulded, heated to evaporate the solvent, transferred to a kiln and fired to sintering (about 1500°). Strong crucibles were obtained following the procedures described in batches 1 and 3. The procedure of batch 1 is obviously very expensive owing to the long grinding time necessary to obtain the ultrafine particles, whereas, in the procedure of batch 3 this was obviated by the use of an additive according to the invention.

EXAMPLE 17

Manufacture of silica glass tubes

Tubes of silica glass of 2.5 cm internal diameter and 0.3 cm wall thickness were made from ground silica glass having a particle size of $-100 + 400$ mesh, by two different methods:

1. 100 parts of silica glass powder were mixed with 6 parts of tetraethyl silicate, 3 parts of methyl alcohol, 1 part of concentrated aqueous hydrochloric acid and 1 part of water.
2. 100 parts of silica glass powder were mixed with 5 parts of a 20% solution of smoked rubber in benzene and 5 parts of hexa-ethoxy-disiloxane $[(C_2H_5O)_3Si-O-Si(OC_2H_5)_3]$ as an additive.

From these mixtures, tubes were moulded and then heated at 150° for the removal of the solvents. At this stage, hydrolysis and gelation of the tetraethyl silicate took place in batch 1 so that after drying a quite strong tube was obtained. In batch 2 the tubes were also strong owing to the binding action of the rubber.

The tubes were then heated to various temperatures and tested qualitatively. At 600°, for example, the tubes prepared by batch 1 were very weak and some of them cracked, while those prepared according to batch 2 were stronger than after drying at 150°. At 1000°, the tubes prepared by batch 1 were still weak while those according to batch 2 had progressively increased in strength. At 1400° - 1500° all the tubes were sintered.

EXAMPLE 18

Manufacture of silicon carbide slabs

Silicon carbide slabs, $23 \times 23 \times 2.5$ cm, such as are used in oil-fired muffle furnaces, were produced from $-14 + 325$ mesh silicon carbide particles. Two batches were prepared:

1. 100 parts of silicon carbide were mixed with 1 part of sulfite lye dissolved in 4 parts of water.
2. The same mixture as in batch 1 with the further addition of 5 parts of stannous dibutyl phosphate, Sn $[(C_4H_9)_2.PO_4]_2$, as an additive.

The slabs were formed by ramming in a suitable mould, and dried at 110°. After drying they were fired at various temperatures, up to 1400°. The crushing strength is shown in Table 14.

Table 14

| | | Cold Crushing Strength | | | |
|---|---|---|---|---|---|
| Firing temperature | | 200° | 600° | 1000° | 1400° |
| Batch | 1) | 120 | 35 | 35 | 160 |
| | 2) | 100 | 170 | 280 | 820 |

Similar results were obtained when sodium-dibutyl phosphate is used as an additive.

EXAMPLE 19

Manufacture of corundum tubes

Corundum tubes used for electric furnaces and having 5 cm internal diameter, 0.5 cm wall thickness and 42 cm length were produced from $-100 + 400$ mesh corundum having the chemical composition stated in Example 2.

One set of tubes was produced by moulding a mixture of 100 parts of corundum and 1 part of dextrine dissolved in 5 parts of water, drying at 110° and firing the tubes in an oil-fired furnace. After drying at 110° the tubes were quite strong, but on firing in the furnace most of them developed cracks and some collapsed at about 800°. Those that remained intact acquired some strength only at 1400°.

Another set of tubes was prepared from a mixture of 100 parts of corundum and 1 part of dextrine in 5 parts of water to which 5 parts of bis-trimethyl siloxy titanate complexed with 8-hydroxyquinoline, $([(CH_3)_3SiO]_2Ti. 2 C_9H_7NO)$, was added as an additive. After moulding and drying at 110° the tubes were fired at 1400°. The tubes were quite strong after drying and almost all of them remained intact up to 1400°, at which temperature strong, tough tubes were obtained.

The same tubes were produced from corundum mixed with 15% of ball clay. However, when heated up to 1600°, these last tubes were fused and deformed, while those produced with the additive indicated above remained unchanged.

EXAMPLE 20

Production of magnesia bricks

The procedure was carried out as described in Example 5 but the additive was ferrous-dibutyl phosphate. The crushing strength was as follows:

| Firing temperature | 200° | 400° | 800° | 1400° | 1700° |
|---|---|---|---|---|---|
| Crushing strength | 160 | 220 | 740 | 1100 | 1280 |

EXAMPLE 21

Manufacture of chromite briquettes

Chromite briquettes of $5 \times 5 \times 10$ cm for feeding into an electric ferro-chromium furnace were made from a chromite ore concentrate in the particle size range from $-20$ to $+200$ mesh. Two sets of briquettes were made concurrently:

a. 100 parts of chromite were mixed with 5 parts of coal tar, moulded under a pressure of 500 kg/cm$^2$ and fired at 1200°. Most of the briquettes had fallen apart in the kiln when the temperature had reached 600° owing to the combustion of the tar.

b. The same mixture of chromite and tar contained, in addition, 3 parts of potassium thiophenolate as an additive and was briquetted and fired in the same manner. None of the briquettes crumbled and after the firing operation their average cold crushing strength was 160 kg/cm$^2$, which is a satisfactory strength for feeding the briquettes to the electric furnace.

EXAMPLE 22

Manufacture of flint clay bricks

The process was carried out as described in Example 1 but copper triethyl hypophosphate (Batch 1) and cadmium dibutyl thiophosphate (Batch 2), respectively, were used as additives. The crushing strengths of the bricks are given in Table 15.

Table 15

| | Cold Crushing Strength | | |
|---|---|---|---|
| Firing Temperature | 200° | 600° | 1600° |
| Batch 1) | 150 | 320 | 600 |
| Batch 2) | 150 | 310 | 600 |

EXAMPLE 23

Manufacture of porcelain slabs

The process was carried out as described in Example 6 but barium dimethyl phosphate (Batch 1) and zirconium diallyl thiophosphate (Batch 2), respectively, were used as additives. The crushing strengths of the slabs are given in Table 16.

Table 16

| | Cold Crushing Srength | | | |
|---|---|---|---|---|
| Firing Temperature | 200° | 600° | 800° | 1400° |
| Batch 1) | 70 | 250 | 350 | 680 |
| Batch 2) | 70 | 225 | 325 | 660 |

EXAMPLE 24

Manufacture of magnesia bricks

The process was carried out as described in Example 4 but nickel diallyl phosphate was used as an additive. After firing, the crushing strength of the bricks was as follows:

| Temperature | 200° | 600° | 1000° | 1400° | 1600° |
|---|---|---|---|---|---|
| Crushing strength | 170 | 650 | 850 | 1100 | 1200 |

Similar results were obtained with cobalt tripropyl hypothiophosphate.

EXAMPLE 24

Manufacture of bauxite bricks

The bauxite used for these bricks was calcined bauxite, containing 86% $Al_2O_3$ and of particle size $-8 +200$ mesh. It was desired to minimize the amount of plastic clay used as a binder in order to obtain bricks of high refractoriness.

90 parts of bauxite were mixed with 10 parts of plastic ball clay and 6 parts of water. From this mixture a number of bricks of $23 \times 11.5 \times 6.5$ cm were moulded in a steel mould at a pressure of 1 ton/cm². The bricks were dried at 110°, to ensure the complete removal of water, and separated into three groups:
1. The bricks were left without additional treatment.
2. The bricks were soaked in a saturated benzene solution of vanadyl dibutyl thiophosphate.
3. The bricks were soaked in a saturated benzene solution of manganese dibutyl thiophosphate.

The bricks soaked in the benzene solutions absorbed an amount of solution corresponding to about 2 parts of additive per 100 parts of bauxite and clay. The soaked bricks were dried at 80° C for evaporating the benzene. Several bricks from each group were subjected to firing at 400°, 1000° and 1400°, respectively. The cold crushing strength of these bricks is given in Table 17.

Table 17

| | Cold Crushing Strength | | |
|---|---|---|---|
| Firing Temperature | 400° | 1000° | 1400° |
| Batch 1) | 200 | 230 | 350 |
| Batch 2) | 210 | 420 | 540 |
| Batch 3) | 220 | 400 | 530 |

EXAMPLE 25

Manufacture of silicon carbide supports

Supports for kiln furniture were made from silicon carbide of particle size $-8 +270$ mesh in the form of prisms of $4 \times 4 \times 12$ cm. Three parallel batches were prepared:
1. 100 parts of SiC were mixed with 3 parts of coal tar.
2. The same mixture as in batch (1) with the further addition of 5 parts of bismuth dibutyl phosphate.
3. The same mixture as in batch (1) with the further addition of 5 parts of antimony dimethyl phosphate.

The supports were moulded at a pressure of 1 ton/cm² and fired slowly up to 1400° C. The crushing strength of the fired bodies is tabulated in Table 18.

Table 18

| | Cold Crushing Strength | | | |
|---|---|---|---|---|
| Firing temperature | 200° | 400° | 800° | 1400° |
| Batch 1) | 75 | 30 | 20 | 210 |
| Batch 2) | 75 | 350 | 750 | 1100 |
| Batch 3) | 75 | 325 | 700 | 1000 |

EXAMPLE 26

Manufacture of porcelain bodies

From porcelain ground to particle size of $-200$ mesh, three batches were prepared:
1. 100 parts of porcelain were with 5 parts of a 10% solution of smoked rubber in xylene.
2. The same mixture as in batch (1) with the further addition, as an additive, of 5 parts of zinc dimethylphosphate in 5 parts of methyl alcohol.
3. The same mixture as in batch (2), but lead dibutyl thiophosphate was used as an additive.

Cylindrical bodies of 5 cm diameter and 5 cm diameter and 5 cm height were moulded at a pressure of 300 kg/cm². The bodies were heated at 100°-120° C to drive off the solvents and then fired. Their crushing strength is stated in Table 19.

Table 19

| | Cold Crushing Strength | | | |
|---|---|---|---|---|
| Firing Temperature | 400° | 800° | 1000° | 1250° |
| Batch 1) | 60 | 40 | 100 | 610 |
| Batch 2) | 220 | 320 | 430 | 650 |
| Batch 3) | 200 | 310 | 420 | 650 |

EXAMPLE 27

Manufacture of silicon carbide slabs

The process was carried out as described in Example 18 but tantalum dimethyl phosphate was used as an additive. The crushing strength of the slabs was as follows:

| Firing Temperature | 200° | 600° | 1000° | 1400° |
|---|---|---|---|---|
| Crushing Strength | 100 | 350 | 700 | 1100 |

EXAMPLE 28

Manufacture of fused alumina pellets

Grains of fused aluminum oxide ($Al_2O_3$) of particle size $-200$ mesh (Tyler) were mixed with 5% by weight of tristrimethyl siloxy antimony, $Sb[OSi(CH_3)_3]_3$, as a 30% solution in kerosene. The moist powder was pressed into pellets of 2.5 cm diameter by 2.5 cm height in an hydraulic press, at 500 kg/cm². The pressed pellets were held at 110° C for 12 hours. The pellets were heated in an electric furnace at 400° C for 1 hour. Then the temperature was gradually raised up to 1400° C at which temperature they were fired for 1 hour. The cold crushing strength of the pellets after treatment at 400° C was 160 kg/cm² and after firing at 1400° C was 380 kg/cm².

EXAMPLE 29

Manufacture of fused magnesia bodies a. Bodies of various shapes, e.g., bricks, rods, etc., were formed in the following way: crushed fused magnesia of particle size $-20$ mesh was mixed with 3% by weight of pentakis-triethyl siloxy tantalum, $Ta[OSi(C_2H_5)_3]_5$, as a 40% solution in xylene. The mixture was pressed into the required form with an hydraulic press at 300 kg/cm². The bodies were heated in an oven at 140° C until constant weight, then they were introduced in an electric furnace and heated at 50° C/hour up to 500° C, at which temperature they were maintained for 2 hours. After this period, the temperature was raised to 1350° C at a rate of 80° C/hour, and maintained for 5 hours at 1350° C. The crushing strength of the bodies after treatment at 500° C was 150–160 kg/cm² and after firing at 1350° C was 360–380 kg/cm².

b. Instead of the additive used in accordance with the preceding paragraph (a), 5% of phthalocyanine chromium acetate, $Cr(OCH_3CO) (C_{32}H_{16}N_8)$, was used in the form of a 30% suspension in ethyl alcohol. The cold crushing strength of the bodies after treatment at 500° C was 170–190 kg/cm² and after firing at 1350° C was 385–410 kg/cm².

EXAMPLE 30

Manufacture of oxidation-resistant silicon carbide bodies

The bodies were dry-formed in an hydraulic press from a mixture of silicon carbide grains having the following grain-size composition:

| Silicon carbide grains | | % by weight |
| --- | --- | --- |
| Tyler mesh: | 14–24 | 50 |
| | 60–90 | 35 |
| | −600 | 15 | with 2% by weight of beryllium methoxy acetate-$Be(OCH_3) (OCOCH_3)$, as a 30% solution in benzene, and 2% by weight of powdered manganese benzoyl acetonate, $Mn(C_6H_5COCHCOCH_3)_2$. The mixture was blended in a muller-type mixer for about 10 minutes. The bodies were dried at 70° C, then fired at 400° C in an electric furnace for 2 hours. After this period the temperature was raised to 1400° C and maintained for 5 hours. The cold crushing strength of the bodies after treatment at 400° C was 180–200 kg/cm², and after firing at 1400° C was 520–550 kg/cm². The fired bodies showed a 2% increase in weight after a standard oxidation test (500 hours in air-steam atmosphere at 1100° C).

EXAMPLE 31

Manufacture of magnesia bodies

The process was carried out as in Example 29 but 3% by weight of nickel diallyl phosphate, $Ni(OPO)_2(OCH_2—CH=CH_2)_4$, was used, as a 30% solution in xylene. The cold crushing strength of the bodies after treatment at 500° C was 160–170 kg/cm² and after firing at 1350° C was 370–390 kg/cm².

EXAMPLE 32

Manufacture of flint clay bodies

Calcined flint clay, containing 42% $Al_2O_3$ of particle size $-10$ mesh and containing not less than 30% of particles of $-200$ mesh size, was mixed with 5% by weight of barium dimethyl phosphate, $Ba (OP=O)_2 (OCH_3)_4$, and 6% of water, and formed into bodies in an hydraulic press at 500 kg/cm². The bodies were dried in an oven at 110° C and then transferred to an electric kiln and fired at 400° C for 2 hours, and at 1350° C for another 2 hours. The cold crushing strength of the bodies after treatment at 400° C was 160–180 kg/cm² and after firing at 1350° C was 420–445 kg/cm².

EXAMPLE 33

A series of experiments was conducted to demonstrate the unexpected higher strength of the ceramic bodies produced from non-plastic compositions in accordance with the invention as compared to bodies produced by using plastic (or, in Bormann's language "paste-like") compositions in accordance with the teachings of Bormann in British Pat. Nos. 492,576 and 492,577. The experiments are described below and the results are summed up in Table 20 which also includes data concerning the product of the foregoing Example 15.

Experiment 1

100 Parts of white fused corundum consisting of particle size $-8 +325$ mesh (as used in Example 15) were mixed with 5 parts of aluminum lactate binder dissolved in 25 parts water, in order to dissolve the binder. The mixture was very wet. During moulding into plates of $10 \times 10 \times 2$ cm at a pressure of 500 kg/cm², 20 parts of liquid containing dissolved binder and fine corundum particles were squeezed out through the mould openings. The moulded plates were very wet and weak. After drying at 100° to remove the water, the plates were fired at various temperatures to a maximum of 1600°.

Experiment 2

To similar refractory grains as in Experiment 1 there were added 5 parts of powdered aluminum acetotartrate, followed by intensive mixing to distribute the acetotartrate evenly. Then, 5 parts of water were sprayed into the mixture while mixing was continued. Plates $10 \times 10 \times 2$ cm were moulded as in Experiment 1. No excess water was present or squeezed out. The moulded plates were sufficiently strong for handling. The plates were dried and fired similarly to those in Experiment 1.

Experiment 3

To a similar mixture as in Experiment 2, 2% sulfite lye was added and similar plates were moulded, dried and fired.

Experiment 4

To similar refractory grains as in Experiment 1 there were added 23 parts of aluminum formate powder and 10 parts of water. After mixing evenly all the ingredients, plates 10 × 10 × 2 cm were moulded, dried and fired at different temperatures. After firing to 800°, the plates were porous owing to the burning away of the organic part of the binder (present in large amounts), and showed a considerable decrease in strength. After 1600°, the bodies sintered, showed a linear contraction of about 2%, and had an uneven surface appearance.

Experiment 5

To similar refractory grains as in Experiment 1 there were added 5 parts of ultra-fine alumina powder of particle sizes 1 to 5 microns, 2 parts of sulfite lye (green-strength binder) and 6 parts of water. After mixing evenly all the ingredients, plates 10 × 10 × 2 cm were moulded, dried and fired at different temperatures. After firing to 1600°, the bodies sintered and contracted by about 2½%.

The cold crushing strength (CCS) in kg/cm² was determined for each of the products produced in accordance with the above Experiments at different firing temperatures and compared with that of the product of Example 15 of the present application at the same temperatures.

Table 20

| Experiment No. | Amount of Water, Parts Per Hundred | Cold Crushing Strength (CCS) at the Firing Temperatures | | | | |
|---|---|---|---|---|---|---|
| | | 200° | 400° | 800° | 1400° | 1600° |
| 1 | 25 | 10 | 5 | 2 | 15 | 21 |
| 2 | 5 | 15 | 4 | 2 | 17 | 27 |
| 3 | 5 | 170 | 73 | 52 | 19 | 31 |
| 4 | 10 | 20 | 80 | 41 | 310 | 670 |
| 5 | 6 | 80 | 92 | 65 | 370 | 510 |
| Example 15 of present application | No water present; the additive is liquid | 60 | 210 | 390 | 650 | |

Experiments 1 and 2 show low CCS's even at 1600° C. Up to 800° the CCS was even lower, as no green-strength binder was present.

In Experiment 3, the addition of a green-strength binder (to the paste-like slip of Experiment 2) gave an improved result at low temperatures only; when this binder had burned away, no improvement whatsoever over Experiments 1 and 2 was discernible. When Experiment 3 is compared with Example 15, it will be noted that although both employed a green-strength binder, the fundamental difference in technique manifested itself in the very considerable difference in CCS's.

The results of Experiment 4 show that, although large amounts of aluminum formate were used, the CCS's of the plates at low temperatures were low, since no green-strength binder was employed. At 1400°, where sintering of the ultra-fines starts, some increase in the CCS-values was obtained.

In Experiment 5, where a conventional green-strength binder was added, some improvement in the lower temperature range was obtained. At higher temperatures, however, the CCS-values were still very considerably below those of Example 15, and the increase in CCS was obtained by reason of the utilization of the added fines.

The unexpected superiority of the present invention over the teachings of Bormann is thus clearly demonstrated.

We claim:

1. A method for the manufacture of self-bonded bodies from particulate materials selected from the group consisting of oxides of magnesium, silicon, aluminum, zirconium, beryllium, thorium, cerium, titanium, chromium, iron; metal aluminates, titanates, ferrites, and silicates; and carbides of silicon, tungsten, titanium, boron and tantalum characterized in that a shaped mixture containing the particulate material, from 0 to 6% of its weight of water, and from 1 to 10% of its weight of a heat-decomposable additive is subjected to initial green-strength providing conditions in which the additive is substantially not reactive towards any of the other ingredients of the mixture, then heated to a temperature within the range from about 200° C to about 600° C, at which the additive is thermally decomposed and bonding of said particulate material is effected, to form low strength bonded bodies, and then further heated to a higher temperature at which the particles of the particulate material become self-bonding, said additive being characterized by not boiling below 350° C at 760 mm/Hg, and being thermally decomposed at said temperature range from about 200° C to about 600° C to produce a non-volatile inorganic residue amounting to at least 5% of the original weight of the additive, said additive being an organo-phosphorus compound having a non-polymeric inorganic moiety and corresponding to the formula $$M(A_x \text{ or }_{x+1} Q_x) (A'R)_y (R')_z$$

wherein,

M is an element selected from the group consisting of metals and silicon;

A and A' are each O, S or N;

Q is P, P=O or P=S;

R and R' are each H, or a hydrocarbon, substituted hydrocarbon, organo-metallyl or-metalloxy radical, and R' may also be halogen; x and z are each an integer from zero to 5; x' is an integer from 1 to 5, and y is an integer from zero to 8, provided that y and z may not both be zero, and A'R and/or R' can be bonded either to M or Q and there may be more than one type of A'R and/or R' groups in the molecule.

2. A method according to claim 1, characterized in that the particulate material to be bonded is selected from the group of corundum, bauxite, mullite and magnesia.

3. A method according to claim 1, characterized in that the particulate material to be bonded is selected from the group of silica, quartz, silica glass and porcelain.

4. A method according to claim 1, characterized in that the particulate material to be bonded is silicon carbide.

5. A method according to claim 1, characterized in that the additive is selected from the group of lithium bishydroxypropyl phosphate, aluminium-dibutyl phosphate, cobalt-dibutyl phosphate, bismuth-dibutyl phosphate, titanium-dibutyl phosphate, ferrous-dibutyl phosphate, magnesium-dibutyl phosphate, sodium-dibutyl phosphate, stannous-dibutyl phosphate, magnesium diisopropyl phosphate, magnesium bis (B-chloroethyl) phosphate, calcium-bis (2,3-dichloropropyl)-phosphate, lithium-diphenyl phosphate, potassium-dicresyl phosphate, cupric di-isoamyl phosphate, magnesium-cresyl thiophosphate, sodium dimethyl thiophosphate, magnesium iso-octyl phosphite, magnesium di-butyl hypophosphate and cobalt diallyl phosphite.

* * * * *